US009094840B2

(12) United States Patent
Liu et al.

(10) Patent No.: US 9,094,840 B2
(45) Date of Patent: Jul. 28, 2015

(54) METHODS FOR TESTING RECEIVER SENSITIVITY OF WIRELESS ELECTRONIC DEVICES

(71) Applicant: Apple Inc., Cupertino, CA (US)

(72) Inventors: Song Liu, Dublin, CA (US); Tomoki Takeya, Santa Clara, CA (US); Adil Syed, Santa Clara, CA (US); Vishwanath Venkataraman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 13/738,506

(22) Filed: Jan. 10, 2013

(65) Prior Publication Data

US 2014/0194069 A1     Jul. 10, 2014

(51) Int. Cl.
*H04W 24/00*     (2009.01)

(52) U.S. Cl.
CPC ..................... *H04W 24/00* (2013.01)

(58) Field of Classification Search
CPC ..... H04W 24/00; H04W 24/08; H04W 16/18; H04W 24/06; H04B 17/0085; H04B 17/004; H04B 17/0042
USPC .............. 455/67.14, 115.1, 115.2, 226.1, 423
See application file for complete search history.

(56) References Cited

U.S. PATENT DOCUMENTS

| | | | |
|---|---|---|---|
| 5,488,631 A * | 1/1996 | Gold et al. | 375/145 |
| 6,137,830 A | 10/2000 | Schneider et al. | |
| 2006/0114978 A1 * | 6/2006 | Rottacker et al. | 375/226 |
| 2007/0266289 A1 | 11/2007 | Yang | |
| 2008/0018345 A1 * | 1/2008 | Chiba et al. | 324/617 |
| 2010/0131214 A1 | 5/2010 | Seely et al. | |
| 2012/0231745 A1 | 9/2012 | Gregg et al. | |
| 2013/0003809 A1 | 1/2013 | Qi et al. | |

\* cited by examiner

*Primary Examiner* — Nhan Le
(74) *Attorney, Agent, or Firm* — Treyz Law Group; Michael H. Lyons (57) ABSTRACT

A test system may include test equipment for testing the radio-frequency performance of wireless electronic devices. The test equipment may provide radio-frequency downlink signals to a wireless electronic device under test (DUT). The test equipment may perform a power sweep by stepping down the downlink signals in signal power level to test receiver sensitivity for the DUT. The DUT may gather measurement data from the downlink signals. The test equipment may retrieve measurement data from the DUT after downlink signal transmission has ended. The test equipment may identify a trigger in the retrieved measurement data to ensure that the data is synchronized with the power sweep in the transmitted downlink signals. The test equipment may identify path loss information associated with the test system. The test equipment may compute receiver sensitivity values for the DUT based on the path loss information and retrieved measurement data.

10 Claims, 8 Drawing Sheets

METHODS FOR TESTING RECEIVER SENSITIVITY OF WIRELESS ELECTRONIC DEVICES

BACKGROUND

This relates generally to electronic devices, and more particularly, to electronic devices having wireless communications circuitry.

Wireless electronic devices such as portable computers and cellular telephones are often provided with wireless communications circuitry. The wireless communications circuitry typically includes transceiver circuitry, antenna circuitry, and other radio-frequency circuitry that provides wireless communications capabilities.

The wireless communications circuitry is operable to receive radio-frequency signals. The wireless communications circuitry is tested in a test system to ensure adequate radio-frequency performance in response to receiving radio-frequency signals. The test system typically includes test equipment that provides radio-frequency downlink test signals to the wireless communications circuitry. Radio-frequency receive performance of the wireless communications circuitry is typically characterized by a performance metric such as receiver sensitivity. The wireless communications circuitry may fail to satisfy design criteria when the test equipment determines that the wireless communications circuitry has poor receiver sensitivity.

During conventional testing operations, radio-frequency data measured by the wireless communications circuitry is provided in real time to the test equipment, which adjusts signal power level of the radio-frequency downlink test signals based on the radio-frequency data. Performing test operations in this way may be time consuming and may lead to high manufacturing costs.

It would therefore be desirable to be able to provide improved test systems for testing wireless electronic devices.

SUMMARY

A wireless electronic device may include wireless communications circuitry. The wireless communications circuitry may include baseband circuitry, radio-frequency amplifier circuitry, radio-frequency transceiver circuitry, front-end circuitry, and antenna structures. The wireless communications circuitry may transmit and receive radio-frequency signals at a number of different frequencies.

A test system may be used to perform radio-frequency testing on a wireless electronic device to determine whether the wireless electronic device has adequate radio-frequency performance (e.g., adequate radio-frequency receive performance). Radio-frequency signals may be wirelessly conveyed between the test system and a wireless electronic device under test (DUT) at different frequencies.

During testing, a test system may transmit radio-frequency test signals to a DUT at a number of downlink signal power levels and at a selected frequency. The DUT may gather radio-frequency measurements such as radio-frequency performance information (e.g., error rate measurement data such as bit error rate, frame error rate, etc.) on the test signals without transmitting the performance information to the test system while the DUT is receiving the test signals from the test system. While receiving test signals, the DUT may run test software that identifies instructions for gathering the radio-frequency measurements. The test software may be stored on storage circuitry in the DUT prior to testing and may be disabled after testing.

The DUT may transmit radio-frequency uplink signals at a selected uplink power level to the test system while gathering performance information from the test signals. The DUT may compare gathered performance information to a predetermined threshold (e.g., error rate measurement value thresholds). If the DUT determines that the performance information exceeds the predetermined threshold, the DUT may reduce uplink power level. By reducing uplink power level, the DUT may instruct the test system to end transmission of the downlink test signals at the selected frequency (e.g., after a predetermined buffer time). The tester may, if desired, transmit additional test signals to the DUT at additional frequencies. Once no frequencies remain to be tested, the test system may retrieve the performance information from the DUT (e.g., the test system may retrieve test data gathered by the DUT from the test signals).

Downlink test signals provided by the test system to the DUT may include a trigger signal having a trigger duration. Some of the power levels with which the test signals are transmitted by the test system may form a sensitivity power level sweep (e.g., a sequence of monotonically decreasing downlink power level steps). The trigger signal may identify the beginning of the sensitivity power level sweep. The DUT may gather a measured trigger signal having a measured trigger duration from the test signals. The test system may compare the measured trigger duration to the trigger duration in the test signals to determine whether the measured performance information is synchronized with the corresponding test signals.

If the measured performance information is unsynchronized with the test signals, the DUT may be flagged as failing synchronization and, if desired, may be calibrated by adding offset data to the performance information (as an example). If the measured performance information is determined to be synchronized, the test system may identify receiver sensitivity for the DUT. The receiver sensitivity may, for example, be determined by identifying a power level in the sensitivity power level sweep at which the DUT measures performance information that exceeds the predetermined threshold. If desired, the test system may identify a path loss power level associated with the DUT. The test system may use the path loss power level to adjust the receiver sensitivity identified by the test system. The receiver sensitivity identified by the test system may be used to characterize the radio-frequency performance of the DUT.

Further features of the present invention, its nature and various advantages will be more apparent from the accompanying drawings and the following detailed description.

DETAILED DESCRIPTION

This relates generally to wireless communications, and more particularly, to systems and methods for testing wireless communications circuitry.

Figure 1:
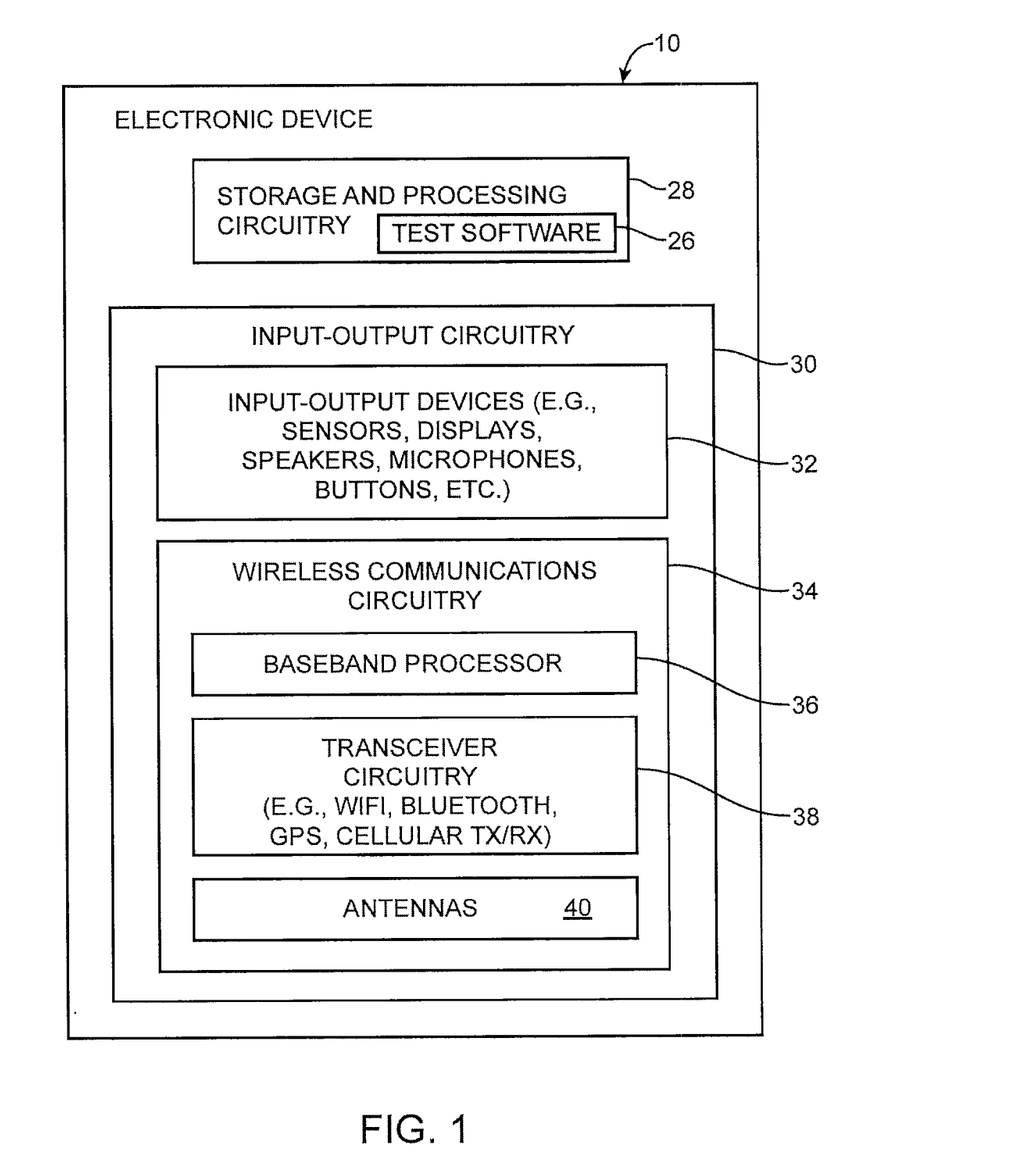
FIG. 1 is a schematic diagram of an illustrative wireless electronic device having wireless communications circuitry and test software in accordance with an embodiment of the present invention.

Electronic devices such as device 10 of FIG. 1 may be provided with wireless communications circuitry. The wireless communications circuitry may be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. The LTE bands are numbered (e.g., 1, 2, 3, etc.) and are sometimes referred to as E-UTRA operating bands.

Long-range signals such as signals associated with satellite navigation bands may be received by the wireless communications circuitry of device 10. For example, device 10 may use wireless circuitry to receive signals in the 1575 MHz band associated with Global Positioning System (GPS) communications, in the 1602 MHz band associated with Global Navigation Satellite System (GLONASS) communications, etc. Short-range wireless communications may also be supported by the wireless circuitry of device 10. For example, device 10 may include wireless circuitry for handling local area network links such as WiFi® links at 2.4 GHz and 5 GHz, Bluetooth® links at 2.4 GHz, etc. In general, wireless communications circuitry in device 10 may support wireless communications in any suitable communications bands.

As shown in FIG. 1, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to communications band selection during radio-frequency transmission and reception operations, software for testing the radio-frequency performance of device 10, etc. To support interactions with external equipment (e.g., a radio-frequency base station, radio-frequency test equipment, etc.), storage and processing circuitry 28 may be used in implementing communications protocols.

Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, the "3G" Evolution-Data Optimized (EV-DO) protocol, the "4G" Long Term Evolution (LTE) protocol, MIMO (multiple input multiple output) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment (e.g., a radio-frequency base station, radio-frequency test equipment, etc.). Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 38 for handling various radio-frequency communications bands. For example, circuitry 38 may handle the 2.4 GHz and 5 GHz communications bands for WiFi® (IEEE 802.11) communications, the 2.4 GHz communications band for Bluetooth® communications, cellular telephone bands such as at 850 MHz, 900 MHz, 1800 MHz, 1900 MHz, and 2100 MHz and/or the LTE bands and other bands (as examples). Circuitry 38 may handle voice data and non-voice data traffic. Transceiver circuitry 38 may include global positioning system (GPS) receiver equipment for receiving GPS signals at 1575 MHz or for handling other satellite positioning data.

Wireless communications circuitry 34 may include one or more antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, monopole antenna structures, dipole antenna structures, helical antenna structures, hybrids of these designs, etc. Different types of antennas may be used for different bands and combinations of bands. For example, one type of antenna may be used in forming a Wi-Fi® wireless link antenna and another type of antenna may be used in forming a cellular wireless link antenna. During communication operations, transceiver circuitry 38 may be used to transmit radio-frequency signals at desired frequencies via antennas 40 (e.g., antennas 40 may transmit wireless signals having a desired frequency).

As shown in FIG. 1, wireless communications circuitry 34 may also include baseband processor 36. Baseband processor 36 may include memory and processing circuits and may also be considered to form part of storage and processing circuitry 28 of device 10.

Baseband processor 36 may be used to provide data to storage and processing circuitry 28. Data that is conveyed to circuitry 28 from baseband processor 36 may include raw and processed data. Raw data may, for example, include downlink data received by antennas 40 (e.g., downlink test data transmitted by external test equipment). Processed data that is passed from baseband processor 36 to storage and processing circuitry 28 may include received (downlink) power level data (e.g., signal power levels of radio-frequency downlink signals received by antennas 40) and error data such frame error rate (FER) data, bit error rate (BER) data, block error rate (BLER) data, symbol error rate (SER) data, etc. Error data passed to circuitry 38 may be indicative of how well wireless communications circuitry 34 receives downlink signals. Baseband processor 36 may, for example, monitor and process raw data to generate radio-frequency error values (e.g., bit error rate values, block error rate values, symbol error rate values, etc.) and received power levels to be conveyed to storage and processing circuitry 28. Baseband processor 26 may generate timing information to be conveyed to storage and processing circuitry 28. Timing information generated by processor 26 may include time stamp values each corresponding to a respective error value and received power level generated by processor 26.

During communications operations, non-idealities (e.g., amplifier noise, amplifier non-linearity, manufacturing variation, etc.) in wireless communications circuitry 34 may degrade the quality of received (downlink) radio-frequency signals. Degradation in signal quality may be greater for downlink signals received at a lower signal power level than for downlink signals received at a higher signal power level. For example, downlink signals received by circuitry 34 at insufficient signal power levels may have undesirable distortions or errors when received at transceiver circuitry 38.

Radio-frequency test operations may be performed on wireless communications circuitry 34 (e.g., using external test equipment) to determine whether circuitry 34 has acceptable radio-frequency performance when receiving radio-frequency downlink signals. Radio-frequency performance of circuitry 34 may be characterized by a radio-frequency performance metric such as receiver sensitivity (sometimes referred to as receive sensitivity or downlink sensitivity). In general, any suitable performance metric associated with received radio-frequency signals may be used to characterize the radio-frequency performance of wireless communications circuitry 34 (e.g., signal to noise ratio, received signal strength indicator (RSSI) information, adjacent channel leakage ratio (ACLR) information, etc.).

If desired, error value data generated by baseband processor 36 during test operations may be used to determine whether wireless communications circuitry 34 satisfies a given performance metric. For example, bit error rate values generated by baseband processor 36 from received radio-frequency signals may be used to determine whether wireless communications circuitry 34 has acceptable receiver sensitivity.

Software for performing radio-frequency test operations on device 10 such as test software 26 may be provided (e.g., stored) on storage and processing circuitry 26. Test software 26 may sometimes be referred to as a test operating system or a test application. Test software 26 may provide instructions for the operation of wireless communications circuitry 34 and storage and processing circuitry 28 during radio-frequency test operations. Test software 26 may, for example, instruct wireless communications circuitry 34 to gather measurements (sometimes referred to as measurement information) from radio-frequency downlink signals received from external test equipment. Measurement information gathered by circuitry 34 during testing may include received power levels, error values (e.g., bit error rate values), and corresponding time stamp values measured from received downlink test signals.

Measurement information gathered by wireless communications circuitry 34 may be stored in storage and processing circuitry 28 until completion of test operations. Once testing has been completed, external test equipment may retrieve and analyze measurement information from device 10 to characterize the radio-frequency performance of circuitry 34. In this way, device 10 may perform test operations autonomously (e.g., wireless circuitry 34 may perform test operations without receiving test instructions from external test equipment and without transmitting measurement information to external test equipment during test operations). By performing test operations autonomously, excessive communication between external test equipment and device 10 during test operations may be avoided, thereby reducing testing time and increasing test efficiency.

Test software 26 may be stored on storage and processing circuitry 28 permanently or temporarily. For example, test software 26 may be loaded onto storage and processing circuitry 28 using external test equipment prior to test operations. If desired, test software 26 may be removed (e.g., deleted, disabled, placed in a hidden state, etc.) from storage and processing circuitry 28 after test operations have been completed.

Figure 2:
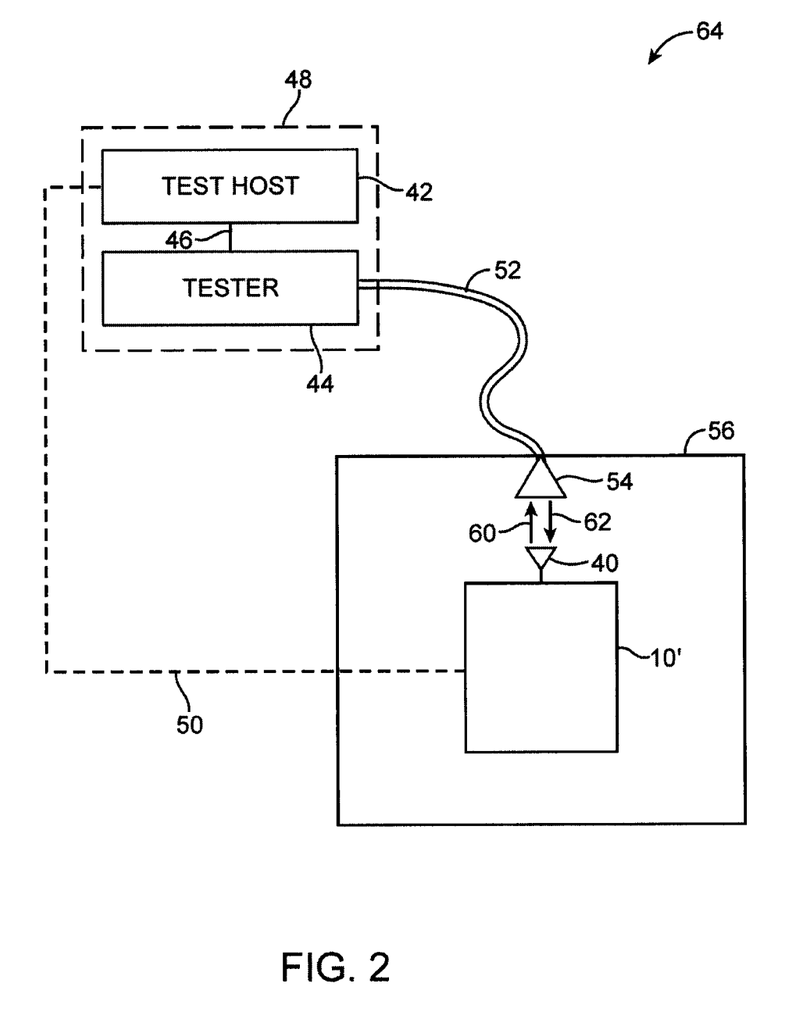
FIG. 2 is a diagram of an illustrative test system including radio-frequency test equipment for testing a wireless electronic device using an over-the-air connection in accordance with an embodiment of the present invention.

As shown in FIG. 2, external test equipment such as radio-frequency test system 64 may be used to perform radio-frequency test operations on wireless communications circuitry in electronic devices such as device 10 (e.g., to ensure adequate radio-frequency performance of wireless communications circuitry 34). Each electronic device that is being tested using radio-frequency test system 64 may sometimes be referred to as a device under test (DUT) 10'. DUT 10' may be, for example, a fully assembled electronic device such as an electronic device 10 or a partially assembled electronic device (e.g., DUT 10' may include some or all of wireless circuitry 34 prior to completion of manufacturing). It may be desirable to test wireless communications circuitry 34 within partially assembled electronic devices so that wireless communications circuitry 34 can be more readily accessed during test operations (e.g., to test the performance of wireless communications circuitry 34 that have not yet been enclosed within a device housing).

As shown in FIG. 2, test system 64 may include test host 42 (e.g., a personal computer, laptop computer, tablet computer, handheld computing device, etc.), a test unit such as tester 44, and a test enclosure structure such as test enclosure 56. Test host 42 and/or tester 44 may include storage circuitry. Storage circuitry in test host 42 and tester 44 may include one or more different types of storage such as hard disk drive storage, nonvolatile memory (e.g., flash memory or other electrically-programmable-read-only memory), volatile memory (e.g., static or dynamic random-access-memory), etc.

Tester 44 may include, for example, a radio communications analyzer, spectrum analyzer, vector network analyzer, power sensor, or any other components suitable for performing radio-frequency test operations on DUT 10'. Tester 44 may be operated directly or via computer control (e.g., when tester 44 receives commands from test host 42). When operated directly, a user may control tester 44 by supplying commands directly to tester 44 using a user input interface of tester 44. For example, a user may press buttons in a control panel on tester 44 while viewing information that is displayed on a display in test unit 44. In computer controlled configurations, test host 42 (e.g., software running autonomously or semi-autonomously on test host 42) may communicate with tester 44 by sending and receiving control signals and data over path 46. Test host 42 and tester 44 may collectively be considered as test equipment 48. Test equipment 48 may be a computer, test station, or other suitable system that performs the functions of test host 42 and tester 44 (e.g., the functionality of test host 42 and tester 44 may be implemented on one or more computers, test stations, etc.).

During testing, at least one DUT 10' may be placed within test enclosure 56. Test enclosure 56 may be a shielded enclosure (e.g., a shielded test box) for use in providing radio-frequency isolation from external sources of radiation, interference, and noise so that DUT 10' is tested in a controlled environment. Test enclosure 56 may, for example, be a transverse electromagnetic (TEM) cell. Test enclosure 56 may have a cubic structure (six planar walls), a rectangular prism-like structure (six rectangular walls), a pyramid structure (four triangular walls with a rectangular base), or any other desired structures.

If desired, the interior of test enclosure 56 may be lined with radio-frequency absorption material such as rubberized foam configured to minimize reflections of wireless signals. Test enclosure 56 may include wireless structures 54 in its interior for communicating with DUT 10' using wireless radio-frequency signals. Wireless structures 54 may sometimes be referred to herein as test antennas 54. Test antenna 54 may, as an example, be a microstrip antenna, microstrip patch antenna, inverted-F antenna, loop antenna, dipole antenna, monopole antenna, planar inverted-F antenna, slot antenna, notch antenna, hybrid antenna, or any other desired antenna structure. During test operations, wireless radio-frequency signals that are transmitted from DUT 10' to antennas 54 (e.g., in the direction of arrow 60) may sometimes be referred to as uplink test signals. Wireless signals that are transmitted from antennas 54 to DUT 10' during test operations (e.g., in the direction of arrow 62) may sometimes be referred to as downlink test signals.

DUT 10' may be optionally coupled to test host 42 via path 50. Path 50 may be, for example, a wired path such as a Universal Serial Bus (USB) cable, a Universal Asynchronous Receiver/Transmitter (UART) cable, or other types of cabling (e.g., bus 218 may be a USB-based connection, a UART-based connection, or other types of connections). Connected in this way, test host 42 may provide software such as test software 26 to be stored on storage and processing circuitry 28 of DUT 10' prior to testing (see FIG. 1) and may receive measurement information from DUT 10' upon completion of testing.

Test antenna 54 may be coupled to tester 44 via radio-frequency cable 52 (e.g., a coaxial cable or any other desired radio-frequency transmission line structure). Test antenna 54 and radio-frequency cable 52 may be used during test operations to perform over-the-air (wireless) testing on DUT 10'. For example, radio-frequency uplink and downlink test signals may be conveyed between DUT 10' and tester 44 via test antenna 54 and radio-frequency cable 52.

During test operations, tester 44 may generate and transmit downlink test signals for DUT 10' (e.g., via cable 52 and antenna 54). Downlink test signals may, if desired, include a sequence of digital bits (e.g., a data stream of digital bits). Tester 44 may generate downlink test signals at different transmit frequencies. For example, tester 44 may generate downlink test signals at a first frequency during a first time period and may generate downlink test signals at a second frequency during a second time period. In another suitable arrangement, tester 44 may generate and transmit downlink test signals in different frequency channels (e.g., different ranges of transmit frequencies).

Tester 44 may generate downlink test signals at different signal power levels (e.g., at different output power levels of tester 44). Output power levels at which downlink test signals are generated by tester 44 may sometimes be referred to as downlink power levels. If desired, tester 44 may sequentially generate downlink test signals at different downlink power levels. For example, tester 44 may generate downlink test signals at a first downlink power level during a first time period and at a second downlink power level during a second time period. Downlink test signals may, if desired, be stepped up or down in downlink power level to test receiver sensitivity of DUT 10' (e.g., the minimum downlink power level for which DUT 10' can still receive corresponding downlink test signals properly). The process by which downlink test signals are stepped down in downlink power level by tester 44 to test for receiver sensitivity may sometimes be referred to herein as a "sensitivity sweep" or "power sweep."

Tester 44 may generate downlink test signals having a so-called "trigger" signal that identifies the beginning of a corresponding power sweep. The trigger may, for example, include of an increase or decrease in downlink power level (e.g., an increase or decrease in power by a known power level) for a predetermined trigger duration prior to the beginning of a power sweep. The trigger may be used after the completion of downlink test signal transmission (e.g., during analysis of measurement information using test equipment 48) to ensure proper synchronization between measurement data gathered by DUT 10' during downlink signal transmission and information associated with the corresponding downlink test signals generated by tester 44 (e.g., a test sequence with which the corresponding downlink signals are generated by tester 44).

DUT 10' may perform desired radio-frequency measurements on the downlink test signals received from tester 44. For example, DUT 10' may measure downlink power levels, error values (e.g., bit error rate values), and time stamp values for the received downlink test signals. Downlink power levels, error values, and time stamp values gathered by DUT 10' from received downlink test signals may sometimes be referred to herein as measured downlink power levels, measured error values, and measured time stamp values, respectively. Measured downlink power levels, measured error values, and measured time stamp values may sometimes be referred to collectively as measurement data. Measured time stamp values may each correspond to a respective measured error value and measured downlink power level (e.g., DUT 10' may record a time stamp value to indicate a time at which each corresponding error value and downlink power level is measured). In this way, DUT 10' may record measured downlink power levels and measured error values as a function of time for downlink test signals received at DUT 10' (e.g., DUT 10' may record a sequence with which downlink test signals are received at different measured downlink power levels).

Test equipment 48 may record information associated with generated downlink test signals such as downlink power levels at which downlink test signals are transmitted to DUT 10'. Test equipment 48 may store time stamp values associated with the downlink test signals (sometimes referred to herein as tester time stamp values). Tester time stamp values may be indicative of the times at which downlink test signals are transmitted at given downlink power levels. In this way, test equipment 48 may record downlink power levels transmitted to DUT 10' as a function of time (e.g., tester 44 may record a sequence with which downlink test signals are transmitted at selected downlink power levels). This information may be used after completion of downlink test signal transmission to ensure proper synchronization between the transmitted downlink test signals and the corresponding measurement data obtained by DUT 10' (e.g., by comparing the duration of a trigger signal measured by DUT 10' to the duration of a corresponding trigger signal in the downlink test signals generated by tester 44). Due to various non-idealities in DUT 10' (e.g., manufacturing variations, timing circuitry variations, etc.), measurement data may sometimes be unsynchronized with respect to the corresponding downlink test data (e.g., measured time stamp values may not match tester time stamp values recorded by tester 44 during testing). Proper synchronization may ensure reliable measurement of receiver sensitivity for DUT 10'.

Tester 44 may perform a series of power sweeps at different frequencies while testing receiver sensitivity for DUT 10'. After performing the series of power sweeps, test host 42 may retrieve the measurement data from DUT 10' and extract portions of the measurement data that correspond to each power sweep performed by tester 44 (e.g., portions of the measurement data each corresponding to power sweeps at respective test frequencies). Each portion of the measurement data may be further divided into groups of measurement data. Each group in a given portion of measurement data may correspond to a respective step in the associated power sweep performed by tester 44. The measurement data (e.g., each group of measurement data) may be considered to be synchronized with a given power sweep in the downlink test signals if the measured time stamp values between the beginning of the trigger signal and the end of the power sweep is consistent with a predetermined value such as the corresponding tester time stamp values associated with the downlink test signals generated by tester 44. In another suitable arrangement, each group of measurement data may be considered to be synchronized if the trigger duration measured by DUT 10' is consistent with a predetermined value such as the corresponding trigger duration generated by tester 44 in the downlink test signals.

Measured downlink power levels may exhibit an offset with respect to the corresponding downlink power levels generated at tester 44. For example, measured downlink power levels may be offset with respect to corresponding downlink power levels generated at tester 44 due to radio-frequency path loss in test system 64.

Radio-frequency path loss can be defined as the attenuation in power as wireless signals propagate through a particular medium. Test system 64 may experience run-to-run measurement variation due to variations in over-the-air (OTA) path loss (e.g., path loss associated with the propagation of radio-frequency signals as they propagate through air, path loss associated with the behavior of test antennas 54 during wireless transmission, etc.). Test system 64 may experience run-to-run measurement variation with respect to other test systems due to OTA path loss and radio-frequency cable path loss associated with cable 52. It may therefore be desirable to characterize test system path loss in order to take variations associated with path loss into account when determining the receiver sensitivity of DUT 10'.

The OTA path loss and radio-frequency cable path loss in a given test system 64 is typically unique, because it is challenging to manufacture test equipment that are exactly identical to one another and to configure each test system 64 with an identical spatial arrangement. OTA path loss may, for example, be sensitive to the location of test antenna 54, the placement of DUT 10' within test enclosure 56, the transmit frequency of tester 44 and DUT 10', etc. Test system 64 may account for path loss when determining receiver sensitivity for DUT 10' (e.g., to determine receiver sensitivity values for DUT 10' that are independent of the test system).

During test operations, DUT 10' may generate and transmit uplink test signals for tester 44 (e.g., via cable 52 and antenna 54). If desired, DUT 10' may generate uplink test signals having different signal power levels. Signal power levels with which uplink test signals are generated may sometimes be referred to as uplink power levels. As an example, DUT 10' may generate uplink test signals at a first uplink power level during a first time period and at a second uplink power level during a second time period.

Software 26 that is stored on storage and processing circuitry 28 may instruct DUT 10' to gather measurement data (e.g., measured power levels, measured error values, and measured time stamp values) from received downlink test signals and may instruct DUT 10' to transmit uplink test signals at selected uplink power levels to tester 44. Measurement data gathered by DUT 10' may be maintained in storage and processing circuitry 28 until completion of testing (e.g., measurement data may be stored as an array of data in storage and processing circuitry 28).

Tester 44 may perform desired radio-frequency measurements on uplink test signals received from DUT 10'. For example, tester 44 may measure uplink power levels of received uplink test signals. During test operations, DUT 10' may adjust uplink power level to signal that DUT 10' has gathered enough measurement data to determine receiver sensitivity. For example, once a sufficient amount of measurement data has been gathered, DUT 10' may reduce uplink power level to signify the end of a power sweep cycle so that test system 64 can prepare another power sweep cycle (e.g., a power sweep cycle at a different test frequency). This is merely illustrative. If desired, DUT 10' may completely shut down uplink transmission or may increase uplink power level to signify the end of a current power sweep cycle.

Once test operations have been completed (e.g., once tester 44 has ceased transmitting downlink test signals), DUT 10' may provide measurement data to test host 42 via path 50. In another suitable arrangement, DUT 10' may wirelessly provide measurement data to test host 42 via antennas 54 and cable 52. Test host 42 may subsequently process the received measurement data to characterize the radio-frequency performance of DUT 10' (e.g., by determining receiver sensitivity for DUT 10').

Figure 3:
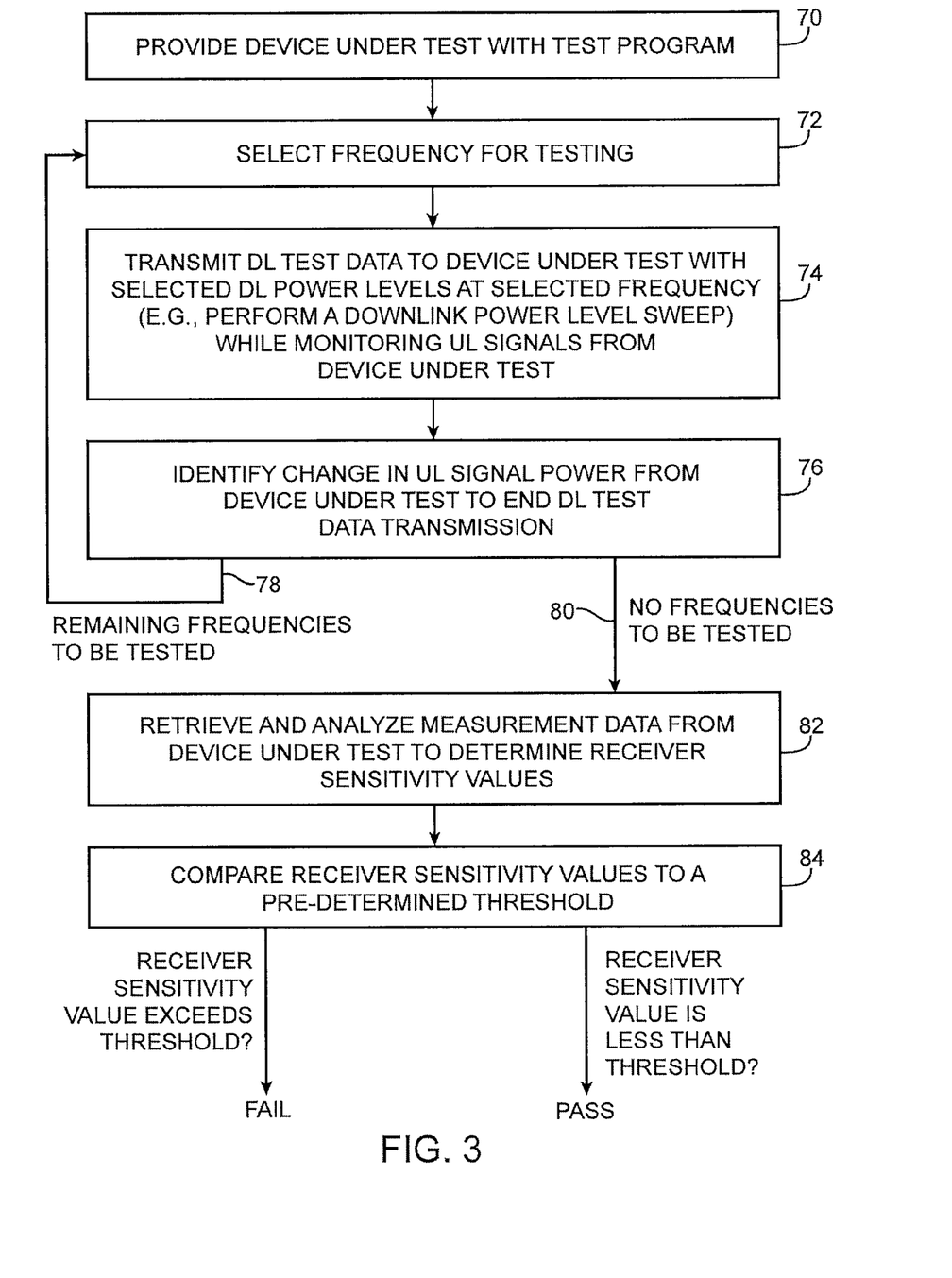
FIG. 3 is a flow chart of illustrative steps for characterizing the radio-frequency performance of a wireless electronic device under test in accordance with an embodiment of the present invention.

FIG. 3 shows a flow chart of illustrative steps that may be performed by a test system such as test system 64 to test the radio-frequency performance of DUT 10'. The steps of FIG. 3 may be performed to ensure adequate receiver sensitivity of DUT 10'.

At step 70, test host 42 may provide test software such as test software 26 to DUT 10'. Test software 26 may be stored on storage and processing circuitry 28 of DUT 10'. Test software 26 may, for example, be conveyed from test host 42 to DUT 10' over path 50 (see FIG. 2). In another suitable arrangement, test software 26 may be wirelessly provided to DUT 10' over cable 52 and test antenna 4. In yet another suitable arrangement, test software 26 may be provided to DUT 10' by a test station operator.

At step 72, test host 42 may select a frequency at which to transmit downlink test signals to DUT 10' (sometimes referred to as a test frequency). The selected test frequency may, for example, be a frequency in a communications band such as a cellular band, GPS band, Wi-Fi® band, or any other desired communications band implemented by DUT 10' during radio-frequency communications.

At step 74, tester 44 transmits downlink test signals (downlink test data) to DUT 10' at the selected test frequency and with desired downlink power levels. For example, tester 44 may step down the downlink test signals in downlink power level for testing receiver sensitivity of DUT 10' (e.g., tester 44 may perform a power sweep using the transmitted downlink test signals). Tester 44 may transmit downlink test signals having a trigger prior to the power sweep (e.g., a trigger that identifies the beginning of the power sweep).

Tester 44 may receive uplink test signals from DUT 10' while transmitting downlink test signals to DUT 10'. Tester 44 may measure uplink power levels of the received uplink test signals. Tester 44 may monitor received uplink test signals for uplink power level adjustments performed by DUT 10'.

At step 76, tester 44 may identify a change in uplink power level (e.g., a change in uplink power level due to an uplink power level adjustment performed by DUT 10'). For example, tester 44 may identify a decrease in uplink signal power level. Tester 44 may subsequently end downlink test signal transmission at the selected test frequency. If desired, tester 44 may continue to step down downlink test signals in downlink power level after identifying a decrease in uplink signal transmission and prior to ending downlink test signal transmission. For example, tester 44 may continue to step down the downlink test signals for a selected buffer time. The buffer time may be selected to allow tester 44 to verify that DUT 10' has properly decreased uplink power level (e.g., to ensure that a decrease in uplink power level provided by DUT 10' is not due to a temporary error or glitch). As another example, tester 44 may continue to step down the downlink test signals for a selected number of additional downlink power levels. If there are additional frequencies to be tested, processing may loop back to step 72 via path 78 to transmit downlink test signals to DUT 10' at the additional test frequencies.

If no frequencies remain to be tested, processing may proceed to step 82, as indicated by path 80. At step 82, test host 42 may retrieve measurement data gathered by DUT 10'. Test host 42 may analyze the retrieved measurement data to determine receiver sensitivity values for DUT 10' at each of the tested frequencies. For example, test host 42 may use measured error values, measured power levels, and measured time stamp values gathered by DUT 10' to determine receiver sensitivity values. Receiver sensitivity values may be determined from the last measured downlink power level that is greater than a downlink power level at which DUT 10' measures excessively high error values (e.g., the lowest downlink power level associated with acceptable downlink signal reception at DUT 10'). During analysis, test host 42 may ensure proper synchronization between retrieved measurement data and downlink test signals transmitted by tester 44. If desired, test host 42 may determine path loss information for DUT 10'. Test host 42 may adjust receiver sensitivity values using the path loss information to generate adjusted receiver sensitivity values that are independent of the particular test system 64 that is used.

At step 84, test host 42 may compare adjusted receiver sensitivity values to predetermined receiver sensitivity thresholds. In response to determining that the receiver sensitivity value for one or more test frequencies is greater than a corresponding receiver sensitivity threshold, test host 42 may determine that DUT 10' fails testing. In other words, if DUT 10' has excessively high receiver sensitivity values (i.e., poor receiver sensitivity), test host 42 may identify that DUT 10' has insufficient radio-frequency receiver performance (e.g., DUT 10' may have degraded signal reception due to excessive non-idealities in wireless communications circuitry 34).

Devices under test that fail testing may be scrapped or, if desired, may be reworked. If desired, test frequencies corresponding to excessively high receiver sensitivity values may be flagged for subsequent analysis. In response to determining that the receiver sensitivity values each satisfy corresponding receiver sensitivity thresholds (e.g., that the receiver sensitivity values are each less than a corresponding receiver sensitivity threshold), test host 42 may determine that DUT 10' passes testing. In this way, test equipment 48 may ensure that DUT 10' has sufficient radio-frequency receive performance.

If desired, DUT 10' may be identified as having unacceptable radio-frequency receive performance if the receiver sensitivity value for any desired number of test frequencies exceeds a corresponding receiver sensitivity threshold. For example, DUT 10' may be characterized as having insufficient radio-frequency receive performance if the receiver sensitivity value at one or more test frequencies fails to satisfy the corresponding receiver sensitivity threshold. Determining whether DUT 10' passes or fails testing may sometimes be referred to as performing pass-fail operations.

Figure 4:
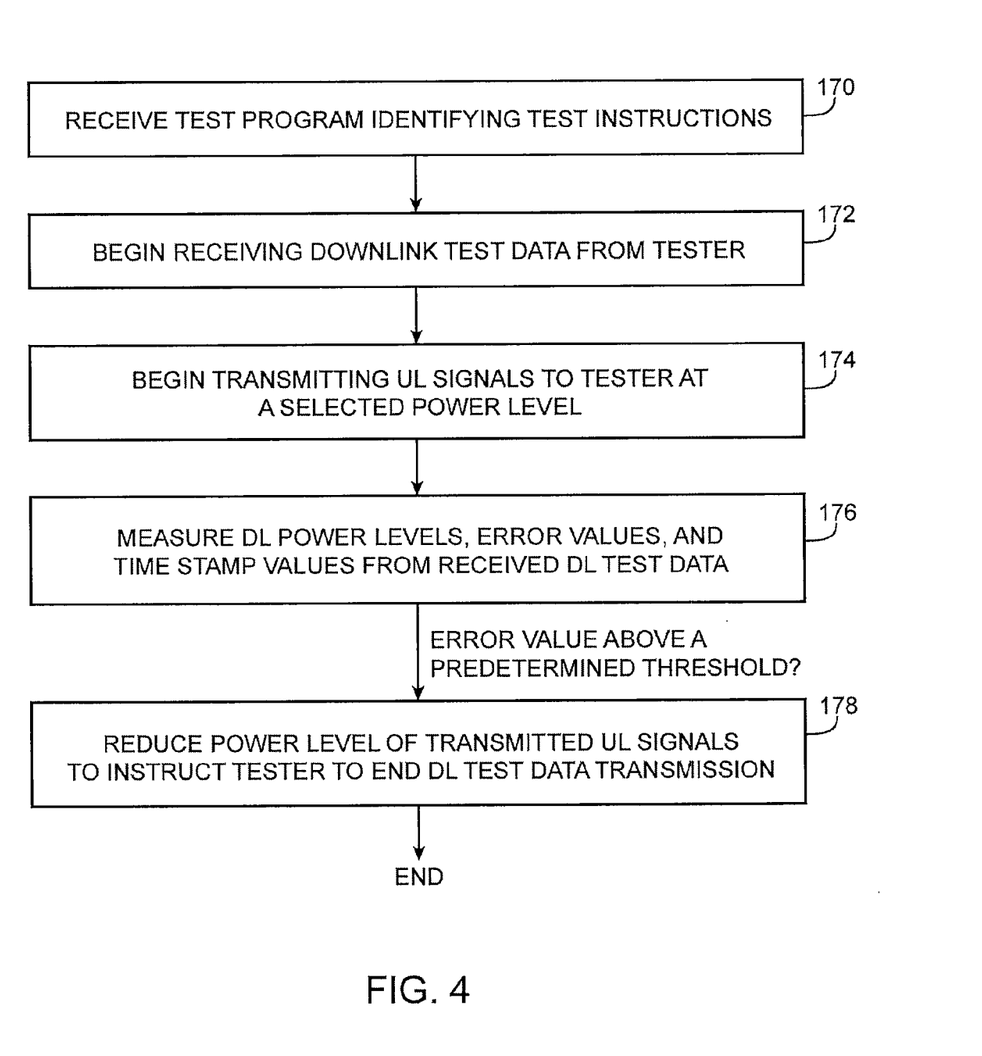
FIG. 4 is a flow chart of illustrative steps that may be performed by a wireless electronic device under test to gather measurement data in response to receiving downlink test signals from test equipment in accordance with an embodiment of the present invention.

FIG. 4 shows a flow chart of illustrative steps that may be performed by a wireless electronic device under test such as DUT 10' during radio-frequency test operations. The steps of FIG. 4 may be performed to determine radio-frequency receive performance for DUT 10'.

At step 170, DUT 10' receives test software 26 from test host 42. Test software 26 received from test host 42 may be stored (e.g., installed) on storage and processing circuitry 28. Test software 26 may instruct DUT 10' to perform radio-frequency test operations. For example, the steps of FIG. 4 may be performed by DUT 10' in response to test instructions provided by test software 26 (e.g., DUT 10' may perform test operations without receiving further test instructions from test equipment 48).

At step 172, DUT 10' may begin receiving downlink test signals (e.g., downlink test data) from tester 44. At step 174, DUT 10' may begin transmitting uplink test signals to tester 44 at a selected uplink power level. Uplink test signals transmitted by DUT 10' may, for example, be transmitted at a maximum output power level of wireless communications circuitry 34, at a minimum output power level of wireless communications circuitry 34, or any other suitable uplink power level. In another suitable arrangement, DUT 10' may begin transmitting uplink test signals prior to beginning to receive downlink test signals from tester 44 (i.e., DUT 10' may, if desired, perform step 174 prior to step 172). DUT 10' may transmit uplink test signals and receive downlink test signals simultaneously.

At step 176, DUT 10' may perform radio-frequency measurements on downlink test signals received from tester 44. For example, DUT 10' may gather measurement data including measured downlink power levels, measured error values, and measured time stamp values from received downlink test signals. Measurement data gathered by DUT 10' may be stored in storage and processing circuitry 28 until completion of testing.

While gathering measurement data from downlink test signals, DUT 10' may compare measured error values to error value thresholds (e.g., DUT 10' may compare error values that have already been measured to error value thresholds while gathering additional measured error values). For example, DUT 10' may compare measured bit error rate (BER) values for received downlink test signals to a bit error rate threshold. When the measured error values exceed the error value threshold, processing may proceed to step 178. The threshold error value may be determined, for example, from carrier-imposed requirements, regulatory requirements, manufacturing requirements, design requirements, or any other suitable standards for the radio-frequency performance of DUT 10'.

At step 178, DUT 10' may reduce the uplink power level provided to tester 44. For example, DUT 10' may reduce uplink power level to half of the maximum output power level of circuitry 34, to a minimum output power level of circuitry 34, or to any other suitable power level that is less than the uplink power level transmitted at steps 174 and 176. By reducing the uplink power level, DUT 10' may signify to tester 44 that DUT 10' has measured excessive error values (e.g., error values that are greater than the error value threshold). In this way, DUT 10' may produce a trigger that instructs tester 44 to end a current power sweep and to begin an additional power sweep (e.g., an additional power sweep at a different test frequency).

Figure 5:
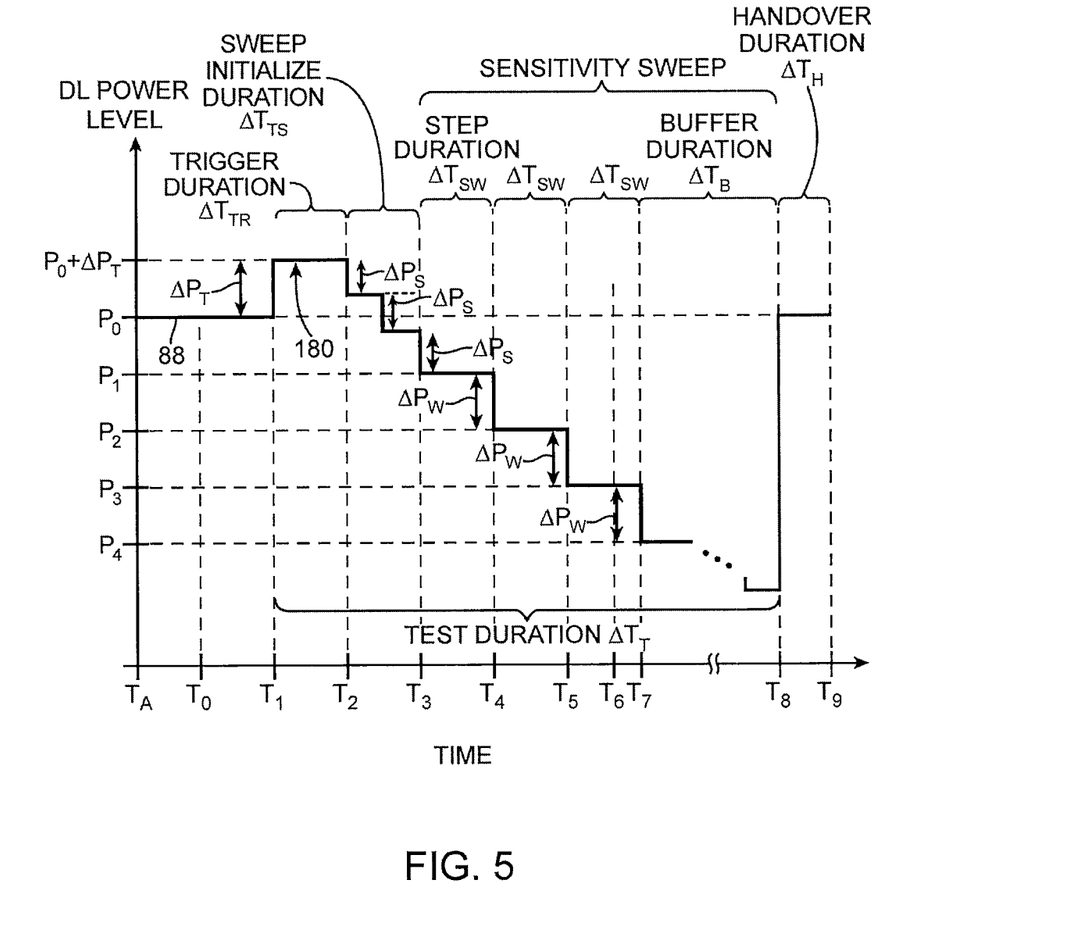
FIG. 5 is a timing diagram illustrating the behavior of test signals that may be provided to a wireless electronic device for testing receiver sensitivity in accordance with an embodiment of the present invention.

FIG. 5 is an illustrative graph showing how downlink test signals may be provided at different downlink power levels to DUT 10' to determine receiver sensitivity of DUT 10' in accordance with an embodiment of the present invention. Curve 88 illustrates downlink power levels over time generated by tester 44 at a selected frequency. Times $T_0$, $T_1$, $T_2$, etc. may, for example, be tester time stamp values stored in test equipment 48. Curve 88 may, for example, be obtained by performing step 74 of FIG. 3.

Between times $T_A$ and $T_1$, tester 44 may provide downlink test data to DUT 10' at downlink power level $P_0$. The duration between times $T_A$ and $T_1$ may be selected to ensure that DUT 10' and tester 44 are able to establish a reliable wireless connection (e.g., to ensure that DUT 10' and tester 44 are communicating at the same test frequency). At time $T_1$, tester 44 may increase downlink power level by trigger size $\Delta P_T$ to power level $P_0+\Delta P_T$. Tester 44 may generate downlink power level $P_0+\Delta P_T$ between times $T_1$ and $T_2$ to form trigger 180 having a trigger duration $\Delta T_{TR}$. Downlink power level $P_0$ may be any suitable output power level that allows DUT 10' to detect trigger 180. Trigger duration $\Delta T_{TR}$ may be any suitable duration that is detectable by DUT 10' upon measurement of the downlink test data associated with curve 88. For example, trigger duration $\Delta T_{TR}$ may be chosen so that DUT 10' has sufficient time to detect an increase in downlink signal power by trigger size $\Delta P_T$.

Between times $T_2$ and $T_3$, tester 44 may step down downlink power level by initialization step size $\Delta P_S$. In the example of FIG. 4, tester 44 decreases downlink power level by initialization step size $\Delta P_S$ three times to sweep initialization power level $P_1$ at time $T_3$. The duration between times $T_3$ and $T_2$ may sometimes be referred to as sweep initialize duration $\Delta T_{TS}$. By stepping down downlink power level between times $T_2$ and $T_3$, tester 44 may ensure that DUT 10' properly receives the downlink test signals associated with curve 88 (e.g., to ensure that DUT 10' maintains a wireless connection with tester 44). A reliable wireless connection between DUT 10' and tester 44 may sometimes be lost or "dropped" in a scenario where downlink power is not suitably stepped down between times $T_2$ and $T_3$. For example, if tester 44 transmits downlink test signals at 40 dBm at time $T_2$ and steps down once to a downlink power level of −40 dBm at time $T_3$, DUT 10' may lose connection with the downlink test signals provided by tester 44 (e.g., due to insufficient response time in wireless circuitry 34, etc.).

At time $T_3$, tester 44 may perform a power (sensitivity) sweep for DUT 10'. For example, tester 44 may step down downlink power level by sweep step size $\Delta P_W$ between times $T_3$ and $T_8$ to provide a number of discrete downlink power levels each for step duration $\Delta T_{SW}$. In the example of FIG. 5, tester 44 may decrease downlink power level by step size $\Delta P_W$ to power level $P_2$ at time $T_4$. After step duration $\Delta T_{SW}$ (e.g., at time $T_5$), tester 44 may decrease downlink power level by step size $\Delta P_W$ to power level $P_3$. After an additional step duration $\Delta T_{SW}$ (e.g., at time $T_7$), tester 44 may decrease downlink power level by step size $\Delta P_W$ to power level $P_4$. This process may be repeated until time $T_8$.

At time $T_8$, tester 44 may reset downlink power to downlink power level $P_0$. At time $T_9$, tester 44 may end transmission of downlink test signals at the selected frequency. If desired, this process may be repeated to provide downlink test signals to DUT 10' at other transmit frequencies (e.g., as shown by path 78 of FIG. 3). The time duration between times $T_8$ and $T_9$ may sometimes be referred to as handover time $\Delta T_H$. Handover time $\Delta T_H$ may be selected to allow sufficient time for DUT 10' to begin receiving downlink test signals at a subsequent test frequency.

For example, DUT 10' may measure an increase in downlink power level to downlink power level $P_0$, after which DUT 10' will have time duration $\Delta T_H$ to begin receiving downlink test signals at the subsequent test frequency (e.g., tester 44 may begin transmitting downlink test signals at the subsequent frequency at time $T_9$). DUT 10' may begin searching for downlink test signals at the additional frequency at time $T_8$. Once a reliable connection between DUT 10' and tester 44 has been established at the additional frequency, this process may be repeated to test DUT 10' at additional frequencies.

In another suitable arrangement, DUT 10' may begin searching for downlink test signals at the additional frequency at time $T_6$. Time $T_6$ may be a time at which DUT 10' measures an error value that is above a predetermined error value threshold (e.g., the time at which DUT 10' reduces uplink power level to instruct tester 44 to prepare for testing at the additional frequency). Tester 44 may begin transmitting downlink test signals at the additional frequency at time $T_8$ (e.g., tester 44 may continue to perform a power sweep for buffer duration $\Delta T_B$ after time $T_6$ before providing downlink power level $P_0$ at the additional test frequency at time $T_8$). DUT 10' may then have a time period given by handover duration $\Delta T_H$ to detect and reliably receive downlink test signals at the additional frequency. The duration between times $T_1$ and $T_8$ may sometimes be referred to as test duration $\Delta T_T$. Test duration $\Delta T_T$ may include trigger duration $\Delta T_{TR}$, sweep initialization duration $\Delta T_{TS}$, and the duration of the sensitivity sweep.

Figure 6:
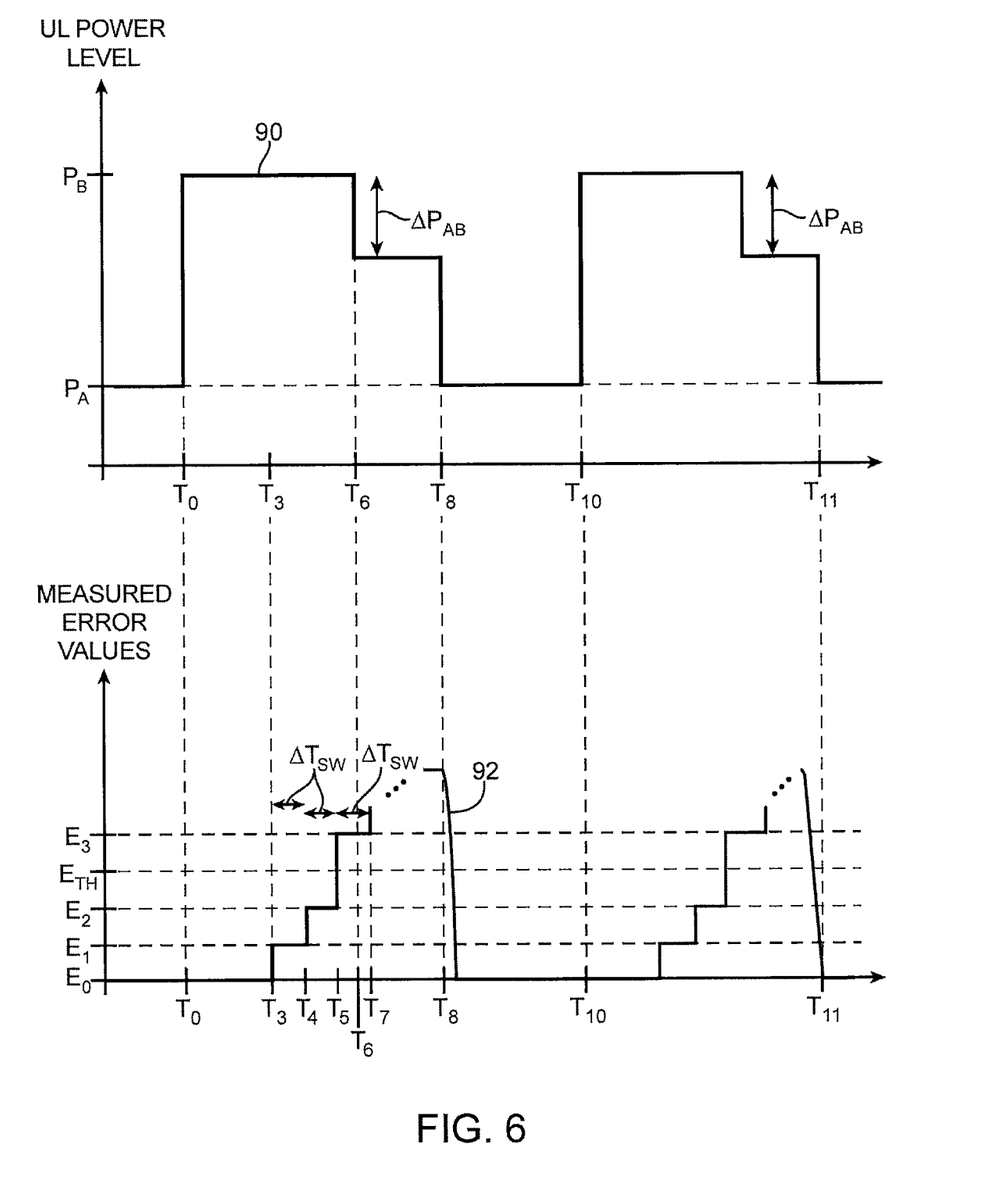
FIG. 6 is a timing diagram illustrating error values that may be measured by a wireless electronic device under test in response to downlink test signals and illustrating the behavior of uplink test signals that may be provided to test equipment for indicating an excessive error value measurement in accordance with an embodiment of the invention.

FIG. 6 is an illustrative graph showing how uplink test signals may be transmitted by DUT 10' to tester 44 in response to receiving downlink test signals and in response to error value measurements gathered by DUT 10'. Curve 90 illustrates uplink power levels transmitted by DUT 10' over time. Curve 90 may, for example, be obtained by performing steps 174-178 of FIG. 4.

Curve 92 illustrates measured error values gathered by DUT 10' from received downlink test signals over time. Curve 92 may, for example, be obtained by performing step 176 of FIG. 4. The uplink test signals associated with curve 90 may be used to instruct tester 44 to end downlink test signal transmission after excessive error values (e.g., error values associated with curve 92) are measured.

Before time $T_0$, DUT 10' may transmit uplink test signals to tester 44 at uplink power level $P_A$. If desired, uplink power level $P_A$ may be a minimum power level of wireless communications circuitry 34. At time $T_0$, DUT 10' may increase uplink power level to power level $P_B$. If desired, power level $P_B$ may be a maximum power level of wireless communications circuitry 34.

Before time $T_3$, DUT 10' may measure error value $E_0$ from the received downlink test signals. Error value $E_0$ may, for example, be negligible because downlink power level $P_0$ transmitted by tester 44 at time $T_0$ is sufficiently high. Between times $T_3$ and $T_8$, DUT 10' may measure error values in response to the sensitivity sweep in the downlink test data. In the example of FIG. 6, DUT 10' measures error value $E_1$ from received downlink test signals between times $T_3$ and $T_4$ (e.g., during a first step of the sensitivity sweep performed by tester 44 in which a downlink power level $P_1$ is generated as shown in FIG. 5). DUT 10' measures error value $E_2$ from received downlink test signals between times $T_4$ and $T_5$ (e.g., during a second step of the sensitivity sweep in which a downlink power level $P_2$ is generated). DUT 10' may measure error value $E_3$ from received downlink test signals between times $T_6$ and $T_7$ (e.g., during a third step of the sensitivity sweep in which a downlink power level $P_3$ is generated). DUT 10' may determine that error value $E_3$ is greater than threshold error value $E_{TH}$. In other words, DUT 10' may measure an excessively high error value from downlink test signals generated at power level $P_3$. In this example, downlink power level $P_3$ may be insufficient for downlink signal reception by DUT 10' (e.g., receiving downlink test signals at or below downlink power level $P_3$ may cause wireless circuitry 34 to measure excessively high error values).

In response to determining that error value $E_3$ is greater than threshold $E_{TH}$, DUT 10' may reduce uplink power level by margin $\Delta P_{AB}$ (e.g., at time $T_6$). If desired, margin $\Delta P_{AB}$ may be equal to the difference between maximum output power level $P_B$ and minimum output power level $P_B$. In general, margin $\Delta P_{AB}$ may be any desired decrease in uplink power level that can be detected by tester 44 (e.g., margin $\Delta P_{AB}$ may be larger than any inherent variation in uplink power level due to instability of wireless communications circuitry 34, thermal noise, measurement tolerance in tester 44, etc.).

In this way, DUT 10' may indicate to tester 44 that DUT 10' has measured excessive error values in response to the downlink test data. Tester 44 may continue to step down downlink power levels and DUT 10' may continue to gather measurement data for a selected buffer time (e.g., between times $T_7$ and $T_8$). The duration between times $T_7$ and $T_8$ may sometimes be referred to as buffer duration $\Delta T_B$ (see, e.g., FIG. 5).

In another suitable arrangement, DUT 10' may measure multiple error values for each step of the sensitivity sweep. In this scenario, error values $E_0$, $E_1$, $E_2$, and $E_3$ may each be average error values that are computed by DUT 10' for all measured error values in each corresponding sensitivity sweep step. If desired, step duration $\Delta T_{SW}$ may be selected to allow DUT 10' to measure a sufficient number of error values for each step in the sensitivity sweep (e.g., a sufficient number of error values necessary to compute reliable average error values, etc.). For example, if DUT 10' is configured to measure each error value in 1 ms and 100 measured error values are desired for each step of the sensitivity sweep, tester 44 may generate downlink test signals having step durations of 100 ms (100*1).

When measurement data is analyzed by test host 42 (e.g., while performing step 82 of FIG. 3), the downlink power level preceding a level at which DUT 10' measures an error value that exceeds the threshold error value may be used to determine a receiver sensitivity value of DUT 10' (e.g., the downlink power level associated with the last adequately received downlink test signals may be used to determine a receiver sensitivity value). In the example of FIGS. 5 and 6, downlink power level $P_2$ (i.e., the downlink power level corresponding to error value $E_2$) may be used to determine a receiver sensitivity value. This process may be repeated between times $T_{10}$ and $T_{11}$ to test DUT 10' at other frequencies (e.g., in response to downlink test signals provided by tester 44 at different test frequencies).

Figure 7:
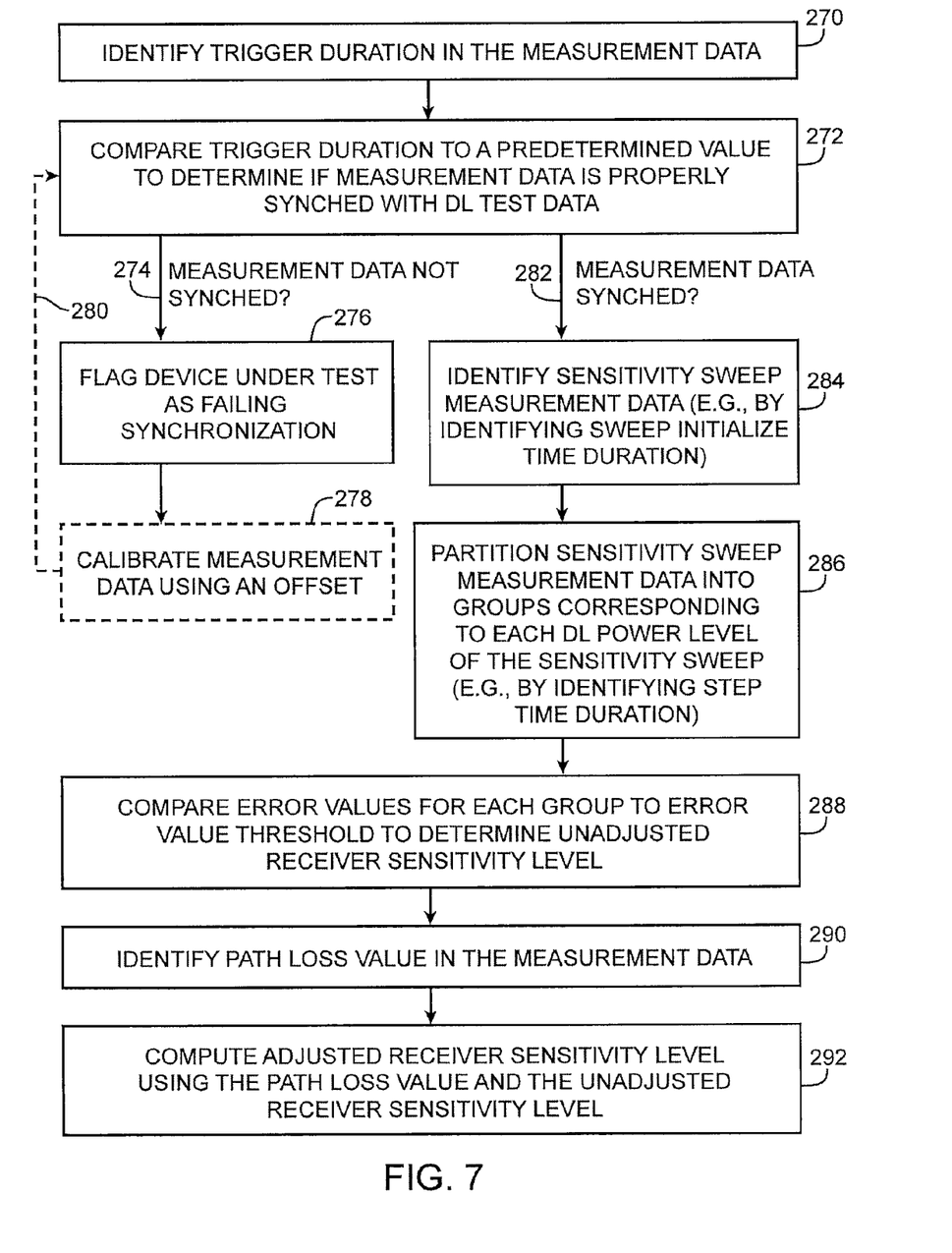
FIG. 7 is a flow chart of illustrative steps that may be performed by test equipment to compute synchronized receiver sensitivity values after retrieving measurement data from a wireless electronic device in accordance with an embodiment of the present invention.

FIG. 7 shows a flow chart of illustrative steps that may be performed by test host 42 to determine reliable receiver sensitivity values for DUT 10' using measurement data gathered by DUT 10'. The steps of FIG. 7 may, for example, be performed as part of step 82 of FIG. 3. The steps of FIG. 7 may be performed by test host 42 after retrieving measurement data gathered by DUT 10' during test operations.

Tester 42 may ensure proper synchronization between measurement data retrieved from DUT 10' and the corresponding test sequence (e.g., the corresponding downlink test signals). The measurement data (e.g., each group of measurement data associated with a respective power level step) retrieved from DUT 10' may be considered to be synchronized with a power sweep in the downlink test signals if a measured time duration between the beginning of trigger signal 180 and the end of the power sweep is consistent with a predetermined time period such as the time period between times $T_1$ and $T_8$ in the downlink test signals (see, e.g., FIG. 5). In another suitable arrangement, each group of measurement data may be considered to be synchronized if the measured time duration between the rising edge and falling edge of trigger signal 180 is consistent with a predetermined time period such as the time period between times $T_1$ and $T_2$ in the downlink test signals.

At step 270, test host 42 may identify measurement data gathered by DUT 10' in response to trigger 180 in the downlink test signals transmitted by tester 44 (sometimes referred to as test trigger 180). For example, test host 42 may identify a set of measured time stamp values, a corresponding set of measured downlink power levels, and a corresponding set of measured error values gathered in response to test trigger 180. Measurement data gathered by DUT 10' in response to test trigger 180 may sometimes be referred to collectively as measured trigger 180'. Test host 42 may identify measured trigger 180' by searching the measurement data for an increase in measured downlink power level by trigger size $\Delta P_T$. Test host 42 may subsequently search for a decrease in measured downlink power level by initialization step size $\Delta P_S$.

Measured time stamp values corresponding to measured trigger 180' may exhibit a measured trigger duration $\Delta T_{TR}'$. At step 272, test host 42 may compare measured trigger duration $\Delta T_{TR}'$ with trigger duration $\Delta T_{TR}$ to ensure proper synchronization between the retrieved measurement data and the downlink test signals. In a scenario where measured trigger duration $\Delta T_{TR}'$ substantially matches trigger duration $\Delta T_{TR}$, the measurement data may be identified as being properly synchronized with the downlink test signals. If measured trigger duration $\Delta T_{TR}'$ does not sufficiently match trigger duration $\Delta T_{TR}$, then the measurement data may be identified as being unsynchronized with the downlink test signals. Proper synchronization may allow test host 42 to determine reliable sensitivity values for DUT 10'.

Figure 8:
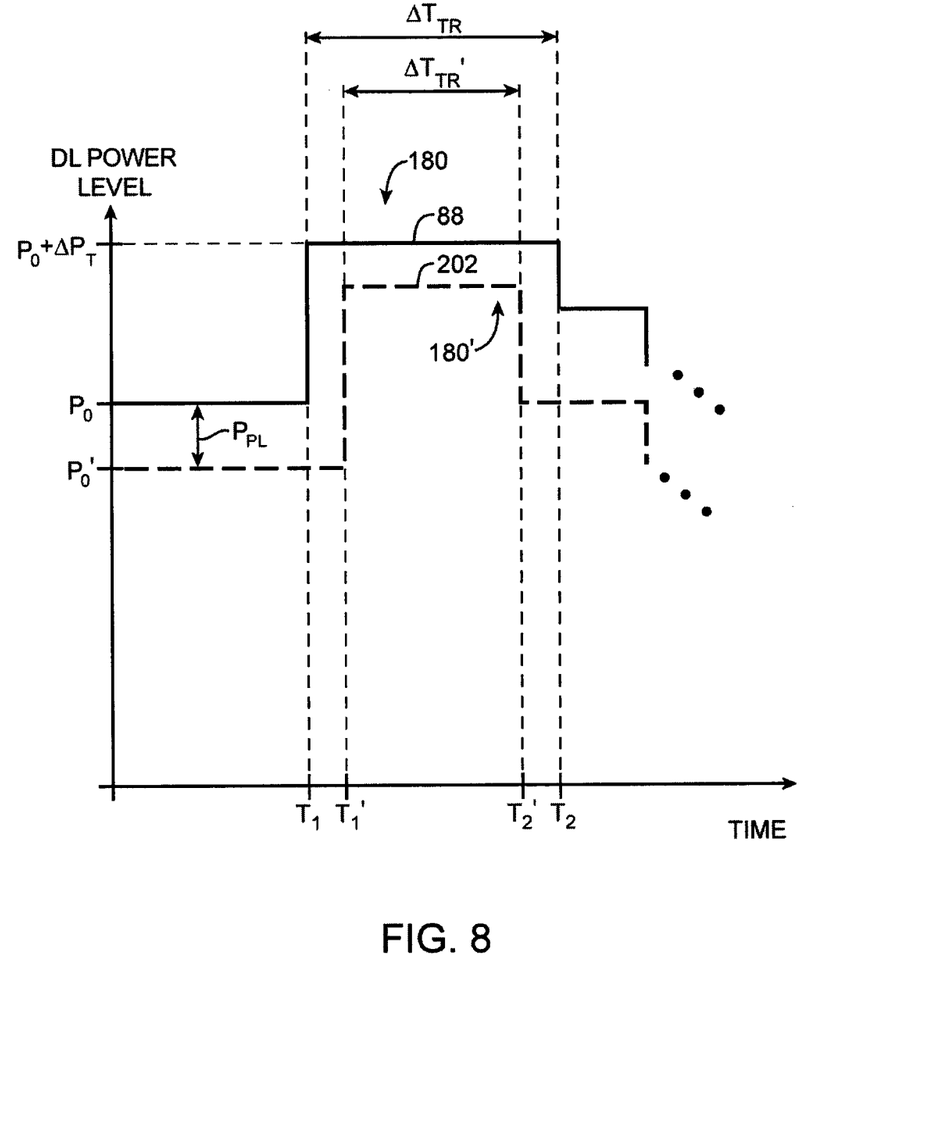
FIG. 8 is an illustrative graph showing how measurement data obtained by a wireless electronic device under test may be unsynchronized with respect to corresponding downlink test signals in accordance with an embodiment of the present invention.

FIG. 8 is an illustrative graph showing how retrieved measurement data (e.g., measured trigger 180') may be unsynchronized with corresponding downlink test signals (e.g., test trigger 180). Curve 88 illustrates downlink power levels generated by tester 44 to form test trigger 180 (e.g., as shown in FIG. 5). Curve 88 may, for example, be stored in test equipment 48 during downlink test signal transmission for comparison with measurement data after test operations.

Curve 202 illustrates measured downlink power levels retrieved by test host 42 from DUT 10'. Times $T_1'$ and $T_2'$ may, for example, be measured time stamp values gathered by DUT 10'. Curve 202 may be obtained by DUT 10' from received downlink test signals (e.g., from downlink test signals associated with curve 88 of FIG. 5). Curve 202 may be compared to curve 88 (e.g., while performing step 272 of FIG. 7) to determine whether the measurement data is properly synchronized with the downlink test data.

In the example of FIG. 8, test host 42 may identify power trigger 180' between measured time stamp values $T_1'$ and $T_2'$ having trigger duration $\Delta T_{TR}'$ (e.g., by searching the measurement data for an increase in measured downlink power level by trigger size $\Delta P_T$, etc.). Test host 42 may determine that the measurement data is unsynchronized with the corresponding downlink test signals because measured trigger duration $\Delta T_{TR}'$ is less than trigger duration $\Delta T_{TR}$. In another suitable arrangement, measurement data may be considered unsynchronized with corresponding downlink test signals when the difference between measured trigger duration $\Delta T_{TR}'$ and trigger duration $\Delta T_{TR}$ exceeds a predetermined threshold. In this arrangement, test host 42 may compute a difference between measured trigger duration $\Delta T_{TR}'$ and trigger duration $\Delta T_{TR}$ (e.g., $\Delta T_{TR}'-\Delta T_{TR}$). Test host 42 may subsequently compare the difference value to a predetermined threshold.

If test host 42 measures excessive variation between the measured trigger duration $\Delta T_{TR}'$ and trigger duration $\Delta T_{TR}$, processing may proceed to step 276 via path 274. At step 276, test equipment 48 may flag DUT 10' as failing synchronization. At optional step 278, test equipment 48 may calibrate the retrieved measurement data to ensure proper synchronization with the corresponding downlink test signals. For example, an offset may be provided to the measured time stamp values to ensure proper synchronization with the corresponding downlink test signals (e.g., offset data may be added to the test data to ensure proper synchronization). Processing may subsequently proceed to step 272 to use ensure that the calibrated measurement data is properly synchronized. By ensuring proper synchronization, test host 42 can determine receiver sensitivity values for DUT 10' using the downlink power levels transmitted by tester 44 and measured downlink power levels gathered by DUT 10'.

If measurement data is properly synchronized with the corresponding downlink test data, processing may proceed to step 284 via path 282. At step 284, test host 42 may identify measurement data associated with the sensitivity sweep performed by tester 44 (e.g., measurement data gathered by DUT 10' from downlink test signals between times $T_3$ and $T_8$ as shown in FIG. 5). Measurement data associated with the sensitivity sweep may sometimes be referred to herein as sensitivity sweep data and may include measured power levels, measured error values, and measured time stamp values gathered by DUT 10' during the sensitivity sweep. Test host 42 may identify sensitivity sweep data by, for example, searching for retrieved measurement data having a measured time stamp value that is greater than time $T_3$.

At step 286, test host 42 may partition sensitivity sweep measurement data into groups corresponding to each downlink power level of the sensitivity sweep (e.g., a first group corresponding to downlink power level $P_1$ between times $T_3$ and $T_4$, a second group corresponding to downlink power level $P_2$ between times $T_4$ and $T_5$, etc.). Test host 42 may, if desired, partition the sensitivity sweep measurement data using step duration $\Delta T_{SW}$. For example, test host 42 may organize measured downlink power levels and measured error values having measured time stamp values within duration $\Delta T_{SW}$ after time $T_3$ into the first group, within duration $\Delta T_{SW}$ after time $T_4$ into the second group, etc. Test host 42 may, if desired, compute an average measured downlink power level for each sensitivity sweep group.

At step 288, test host 42 may compare measured error values in each sensitivity sweep group to an error value threshold such as threshold error value $E_{TH}$ as shown in FIG. 6. If one or more measured error values in a given sensitivity sweep group exceed threshold error value $E_{TH}$, the downlink power level associated with the immediately preceding sensitivity sweep group may be recorded as an unadjusted receiver sensitivity level (e.g., the last measured power level that satisfies the error value threshold may be identified as the unadjusted receiver sensitivity). This process may be repeated to determine unadjusted receiver sensitivity values for all frequencies tested.

In another suitable arrangement, test host 42 may compute an average measured error value for each group. For example, test host 42 may compute a first average error value $E_1$ for the first sensitivity sweep group of measurement data between times $T_3$ and $T_4$ (e.g., as shown in FIG. 6), may compute a second average error value $E_2$ for the second sensitivity sweep group between times $T_4$ and $T_5$, etc. If the average error value in a given sensitivity sweep group exceeds error threshold value $E_{TH}$, the average power level of the immediately preceding group may be identified as the unadjusted receiver level.

At step 290, test host 42 may identify path loss information for the measurement data. Path loss power may be determined, for example, by comparing measured downlink power level at time $T_0$ to the corresponding downlink power generated by tester 44. In the example of FIG. 8, tester 44 generates downlink test signals having downlink power level $P_0$, whereas DUT 10' measures downlink power level $P_0'$ at time $T_0$. Test host 42 may determine that measured downlink power level $P_0'$ is less than downlink power level $P_0$ by path loss margin $P_{PL}$. Path loss margin $P_{PL}$ may, for example, result from over-the-air and radio-frequency cable path loss in test system 64.

At step 292, test host 42 may compute an adjusted receiver sensitivity level for DUT 10' using path loss margin $P_{PL}$ and the unadjusted receiver sensitivity value. For example, test host 42 may add the path loss power $P_{PL}$ to the unadjusted receiver sensitivity value to obtain an adjusted receiver sensitivity value. Adjusted receiver sensitivity values computed by test host 42 may be independent of test system 64 and the placement of DUT 10' within test system 64 during test operations. This process may be performed to compute adjusted receiver sensitivity values for all frequencies tested. The adjusted receiver sensitivity values may be used to characterize the radio-frequency performance of DUT 10' (e.g., by performing step 84 of FIG. 3).

FIGS. 4-8 are merely illustrative. If desired, tester 44 may step down downlink test signals in downlink power level during the sensitivity sweep any desired number of times. For example, tester 44 may step down the downlink power level ten times, twenty times, etc. Similarly, DUT 10' may measure a number of error values each corresponding to each step of the downlink power sweep. If desired, tester 44 may produce trigger 180 by decreasing downlink power level by trigger size $\Delta P_T$. In this scenario, test host 42 may search for the measurement data for a decrease in measured downlink power level by trigger size $\Delta P_T$ when identifying measured trigger 180'. If desired, tester 44 may step down the downlink test signals during the sensitivity sweep using different step durations $\Delta T_{SW}$ (e.g., tester 44 may produce downlink power level $P_2$ for a first step duration, may produce downlink power level $P_3$ for a second step duration that is longer than the first step duration, etc.). Similarly, different step sizes $\Delta P_W$ may be used for each sensitivity sweep step (e.g., tester 44 may decrease downlink power level by a first margin at time $T_3$, by a second margin at time $T_4$ that is greater than the first margin, etc.).

Measurement data gathered by DUT 10' may include any desired radio-frequency measurements performed by DUT 10' in response to receiving downlink test signals. For example, measurement data may include RSSI information, ACLR information, signal to noise ratio information, etc. The measurement data may include any suitable information gathered by DUT 10' for determining receiver sensitivity of DUT 10'.

If desired, test duration $\Delta T_T$ may be used to ensure proper synchronization between the measurement data and corresponding downlink test signals. In this scenario, test host 42 may determine that the downlink test signals are unsynchronized with the measurement data if test duration $\Delta T_T$ in the downlink test signals does not suitably match the corresponding test duration in the measured time stamp values. In another suitable arrangement, both test duration $\Delta T_T$ and test trigger 180 may be used to determine whether the measurement data retrieved by test host 42 is synchronized (e.g., the measurement data may be unsynchronized if one of the trigger time or the test time does not match between the measured time stamp values and the tester time stamp values).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using a test system to test a device under test, comprising:
   with the test system, transmitting radio-frequency test signals at a plurality of power levels to the device under test, wherein the radio-frequency test signals include a test trigger signal having a test trigger duration;
   with the test system, receiving test data from the device under test, wherein the test data includes a measured trigger signal having a measured trigger duration;
   with the test system, determining whether the test data is synchronized with the test signals by comparing the measured trigger signal to the test trigger signal;
   with the test system, computing a difference between the measured trigger duration and the test trigger duration; and
   comparing the difference to a predetermined threshold to determine whether the test data is synchronized with the test signal.

2. The method defined in claim 1, wherein determining whether the test data is synchronized with the test signals comprises:
   comparing the measured trigger duration to the test trigger duration.

3. The method defined in claim 1, wherein the radio-frequency test signals further include a sensitivity power level sweep, and wherein the test trigger signal identifies a beginning of the sensitivity power level sweep.

4. The method defined in claim 1, further comprising:
   in response to determining that the test data is unsynchronized with the test signals, flagging the device under test as failing synchronization using the test system.

5. The method defined in claim 1, further comprising:
   in response to determining that the test data is synchronized with the test signals, identifying a receiver sensitivity for the device under test using the test data.

6. The method defined in claim 1, further comprising:
   with the test system, identifying a path loss power level associated with the device under test.

7. The method defined in claim 6, further comprising:
   in response to determining that the test data is synchronized with the test signals, computing a receiver sensitivity value for the device under test using the test data and the path loss power level.

8. A method of using a test system to test a device under test, comprising:
   with the test system, transmitting radio-frequency test signals at a plurality of power levels to the device under test, wherein the radio-frequency test signals include a test trigger signal;
   with the test system, receiving test data from the device under test, wherein the test data includes a measured trigger signal;
   with the test system, determining whether the test data is synchronized with the test signals by comparing the measured trigger signal to the test trigger signal; and
   in response to determining that the test data is unsynchronized with the test signals, calibrating the test data by adding offset data to the test data so that the test data is synchronized with the test signals.

9. The method defined in claim 8, further comprising:
   in response to determining that the test data is unsynchronized with the test signals, flagging the device under test as failing synchronization using the test system, wherein flagging the device under test as failing synchronization further comprises calibrating the test data by adding the offset data to the test data so that the test data is synchronized with the test signals.

10. A method of using a test system to test a device under test, comprising:
    with the test system, transmitting radio-frequency test signals at a plurality of power levels to the device under test, wherein the radio-frequency test signals include a test trigger signal;
    with the test system, receiving test data from the device under test, wherein the test data includes a measured trigger signal;
    with the test system, determining whether the test data is synchronized with the test signals by comparing the measured trigger signal to the test trigger signal; and
    in response to determining that the test data is synchronized with the test signals, identifying a receiver sensitivity for the device under test using the test data, wherein the test data includes error rate data, and identifying the receiver sensitivity comprises:
comparing the error rate data to a predetermined threshold; and
identifying a power level in the plurality of power levels at which the device under test measures error rate data exceeding the predetermined threshold.

\* \* \* \* \*